(12) United States Patent
Baudin et al.

(10) Patent No.: US 12,285,806 B2
(45) Date of Patent: Apr. 29, 2025

(54) SYSTEM AND METHOD FOR TRACING THE USE OF A CUTTING EDGE

(71) Applicant: SECO TOOLS AB, Fagersta (SE)

(72) Inventors: Micael Baudin, Uppsala (SE); Jan Gravningsbraten, Angelsberg (SE); Mikael Lindholm, Vasteras (SE)

(73) Assignee: SECO TOOLS AB, Fagersta (SE)

( * ) Notice: Subject to any disclaimer, the term of this patent is extended or adjusted under 35 U.S.C. 154(b) by 814 days.

(21) Appl. No.: 17/606,320

(22) PCT Filed: Apr. 27, 2020

(86) PCT No.: PCT/EP2020/061623
§ 371 (c)(1),
(2) Date: Oct. 25, 2021

(87) PCT Pub. No.: WO2020/221694
PCT Pub. Date: Nov. 5, 2020

(65) Prior Publication Data
US 2022/0212268 A1 Jul. 7, 2022

(30) Foreign Application Priority Data

Apr. 30, 2019 (EP) .................................. 19171911
Jun. 28, 2019 (EP) .................................. 19183279

(51) Int. Cl.
| | |
|---|---|
| *B23B 27/14* | (2006.01) |
| *B23B 27/16* | (2006.01) |
| *B23C 5/20* | (2006.01) |
| *B23Q 17/09* | (2006.01) |

(52) U.S. Cl.
CPC .............. *B23B 27/14* (2013.01); *B23B 27/16* (2013.01); *B23C 5/20* (2013.01); *B23Q 17/0995* (2013.01); *B23B 2260/104* (2013.01); *B23C 2210/66* (2013.01)

(58) Field of Classification Search
CPC ... B23B 27/14; B23B 27/16; B23B 2260/104; G05B 19/12; B23C 5/20; B23C 2210/66; B23Q 17/0995
USPC ........................................................ 700/195
See application file for complete search history.

(56) References Cited

U.S. PATENT DOCUMENTS

| | | | | |
|---|---|---|---|---|
| 2014/0320267 | A1* | 10/2014 | Weber ...................... | B26D 3/24 340/10.4 |
| 2018/0039807 | A1* | 2/2018 | O'Brien ............. | G06K 7/10297 |

FOREIGN PATENT DOCUMENTS

| | | |
|---|---|---|
| EP | 1369811 A1 | 12/2003 |
| JP | 2004351555 A | 12/2004 |
| JP | 2019042831 A | 3/2019 |

(Continued)

Primary Examiner — Michael J Brown
(74) Attorney, Agent, or Firm — Corinne R. Gorski

(57) ABSTRACT

A system, method and computer program product arranged for managing the operation of a machine and tracing the use of a cutting edge of a cutting tool used in the operation of the machine. The method includes the steps of reading an identification marker of a cutting edge of a cutting tool inserted into the machine, decoding the identification marker to determine a cutting edge information data associated with the cutting edge, obtaining machine operation data associated with the operation of the machine from the machine, and generating a first association data indicative of the cutting edge information data and the machine operation data.

10 Claims, 5 Drawing Sheets

(56) References Cited

FOREIGN PATENT DOCUMENTS

WO 2019094997 A1 5/2019

* cited by examiner

SYSTEM AND METHOD FOR TRACING THE USE OF A CUTTING EDGE

RELATED APPLICATION DATA

This application is a § 371 National Stage Application of PCT International Application No. PCT/EP2020/061623 filed Apr. 27, 2020 claiming priority to EP 19171911.1 filed Apr. 30, 2019 and EP 19183279.9 filed Jun. 28, 2019.

TECHNICAL FIELD

The disclosure pertains to the field of chip removing machining.

BACKGROUND

A cutting tool may comprise one or more cutting edges that are used for removing chips from a piece of material. Typically a cutting tool is inserted into a cutting tool holder and a machine is e.g. rotating the cutting tool holder together with the cutting tool for processing the piece of material. The piece of material is processed when a cutting edge of the cutting tool comes in contact with the piece of material. A cutting tool may comprise one or more cutting edges that are used for removing chips from the piece of material that is being processed by the cutting tool. A cutting edge becomes worn when it is removing chips form the piece of the material. When a cutting edge, or a plurality of cutting edges, of a cutting tool is worn to a certain extent, the cutting tool may need to be replaced or cannot be used for certain type of processing. Dependent on the usage of the cutting tool, e.g. dependent on the piece of material that is processed, and how the piece of material is processed, the cutting edges of the cutting tool becomes worn in a certain way. Dependent on how the cutting tool is inserted into the cutting machine, the cutting tool can be used for different operations. If the cutting tool is inserted in a wrong way in to machine the lifetime of the cutting tool can become shorter. Certain machine settings are desired for a certain cutting tool. If the machine settings are incorrect for the certain cutting tool the lifetime of the certain cutting tool can become shorter and this can also have a negative effect on the processing of the piece of material by the certain cutting tool.

SUMMARY

Today there are cutting tools with an identification marking on each tool in order to manage the tools. A cutting tool can then be identified. There is however a demand for an easier way to manage traceability of the cutting edges on the cutting tools. Different cutting edges can be worn differently, and a certain cutting edge may be dysfunctional on a certain cutting tool. Not knowing anything about the specific cutting edge but only the identification of the cutting tool will not help traceability of a particular cutting edge. In order to e.g. improve the use of cutting edges, there is a demand for an managing traceability of each and every cutting edge, and traceability of the cutting edge when used in processing by a machine. There is also a demand for managing machine operation settings with respect to a certain cutting tool and/or a certain cutting edge of the certain cutting tool. Correct machine settings can improve the lifetime of the cutting edge and also improve the processing of the piece of material. There is also a demand for associating data such as operational data together with a specific cutting edge. Both manufacturers of cutting edges and end-customers of the cutting edges benefit from understanding operation details that are associated with each cutting edge throughout the lifetime of each cutting edge of a cutting tool. These details can e.g. help the end-customer of a cutting tool with cutting edges to e.g. manage the cutting tool and associate certain operation data with a certain cutting tool with certain cutting edges.

An object of the present disclosure is to provide a cutting tool, a system, a method and a computer program product which seek to mitigate, alleviate, or eliminate one or more of the above-identified deficiencies in the art and disadvantages singly or in any combination.

The disclosure proposes a cutting tool comprising at least a first cutting edge and at least a first identification marker arranged at the first cutting edge wherein the at least first identification marker is a machine readable code associated with a first cutting edge information data. This means that the at least a first cutting edge can be identified using the first cutting edge information data.

According to an aspect the cutting tool further comprising a second cutting edge and a second identification marker arranged at the second cutting edge wherein the second identification marker is a machine readable code associated with a second cutting edge information data. This means that the first cutting edge can be identified using the first cutting edge information data and that the second cutting edge can be identified using the second cutting edge information data.

According to an aspect the first identification marker is arranged on the cutting tool at a distance to the first cutting edge that is shorter than the distance from the first identification marker to the second cutting edge, and the second identification marker is arranged on the cutting tool at a distance to the second cutting edge that is shorter than the distance from the second identification marker to the first cutting edge. One advantage with this arrangement of the identification markers is hence that an operator, or a machine, can determine which cutting edge that is associated with a certain identification marker.

According to an aspect the at least first identification marker is at least any of, or a combination of at least any of, a two dimensional code; a three dimensional code, an image a Quick Response code; a High Capacity Colored Two Dimensional Code; a European Article Number code; a DataMatrix code or a MaxiCode. This means that the at least first identification marker is visually readable on the cutting tool by a machine but also visually detectable by e.g. an operator handling the cutting tool.

The disclosure further proposes a system for managing the operation of a machine and tracing the use of a cutting edge of a cutting tool used in the operation of the machine. The system comprises a reader device configured to detect and read at least a first identification marker. The system further comprises a processing circuitry operatively connected to the reader device configured to cause the system to read, by the reader device, an identification marker of a cutting edge of a cutting tool inserted into the machine. The processing circuitry is further configured to cause the system to decode the identification marker to determine a cutting edge information data associated with the cutting edge, obtain machine operation data associated with the operation of the machine from the machine and generate a first association data indicative of the cutting edge identification data and the machine operation. An advantage with the first association data is that the use of the cutting edge can be traced to a certain machine operation data. This means for example that the cutting edge can be traced to be associated with a certain operation when the cutting tool is inserted in the machine at a certain point of time.

According to an aspect the processing circuitry is further configured to cause the system to detect, by the reader device one identification marker arranged at the cutting edge used in the operation of the machine when the cutting tool is inserted into the machine. An advantage with detecting one identification marker arranged at the cutting edge is that it can be determined that a certain cutting edge is used when the cutting tool is inserted in the machine in a certain way.

According to an aspect the processing circuitry is further configured to cause the system to obtain, based on the cutting edge information data, a machine setting data for configuring the machine for an operation of the machine with the cutting edge associated with the cutting edge information data. This means that the machine can be configured with machine setting data that is optimizing the operation of the machine together with the cutting edge that is used when the cutting tool is inserted in the machine in a certain way.

According to an aspect the processing circuitry is further configured to cause the system to determine, based on the cutting edge information data and the machine operation data if the current configuration of the machine is optimized for an operation of the machine with the cutting edge associated with the cutting edge information data. In other words, with knowledge of which cutting edge that is used, it can be determined if the configuration of the machine is optimized for an operation together with the cutting edge or if the machine needs to be reconfigured with other machine settings.

According to an aspect the processing circuitry is further configured to cause the system to perform an operation of the machine with the cutting edge associated with the cutting edge information data, obtain at least a first machine operation sensor data of a sensor configured to obtain sensor data during operation of the machine and generate a second association data indicative of the cutting edge information data and the at least first machine operation sensor data. An advantage with the second association data is that the use of the cutting edge can be traced to a certain machine operation sensor data. This means for example that the cutting edge can be traced to be associated with a certain temperature of the cutting edge during processing of a piece of material dependent on how the cutting tool is inserted in the machine at a certain point of time.

According to an aspect the reader device is arranged to only detect and read one identification marker of one cutting edge of the cutting tool, when the cutting tool is inserted into the machine. An advantage with having the reader device arranged to only detect and read one identification marker when the cutting tool is inserted into the machine, is that a plurality of identification markers can be visible but excluded from being read by the reader device dependent on how the cutting tool is inserted in the machine at a certain point of time.

According to an aspect the reader device is configured to detect and read plural identification markers of plural cutting edges of the cutting tool, when the cutting tool is inserted into the machine, and wherein the processing circuitry is further configured to cause the system to generate a request for a selection of only one identification marker of one cutting edge that is used in the operation of the machine. This means that a plural identification markers can be read by the reader device, and that e.g. an operator of the machine can be requested to select only one identification marker, e.g. via input of a user interface associated with the machine, to select the identification marker of one cutting edge that is used in the operation of the machine.

The disclosure further proposes a method for managing the operation of a machine and tracing the use of a cutting edge of a cutting tool used in the operation of the machine. The method comprising the step of reading, by the reader device, an identification marker of a cutting edge of a cutting tool inserted into the machine and the step of decoding the identification marker to determine a cutting edge information data associated with the cutting edge. The method further comprising the step of obtaining machine operation data associated with the operation of the machine from the machine and generating a first association data indicative of the cutting edge information data and the machine operation data. An advantage with the first association data is that the use of the cutting edge can be traced to a certain machine operation data. This means for example that the cutting edge can be traced to be associated with a certain operation when the cutting tool is inserted in the machine at a certain point of time.

According to an aspect the method further comprising the step of detecting, by the reader device one identification marker arranged at the cutting edge used in the operation of the machine when the cutting tool is inserted into the machine. An advantage with detecting one identification marker arranged at the cutting edge is that it can be determined that a certain cutting edge is used when the cutting tool is inserted in the machine in a certain way.

According to an aspect the method further comprising the step of obtaining, based on the cutting edge information data, a machine setting data for configuring the machine for an operation with the cutting edge associated with the cutting edge information data. This means that the machine can be configured with machine setting data that is optimizing the operation of the machine together with the cutting edge that is used when the cutting tool is inserted in the machine in a certain way.

According to an aspect the method further comprising the step of determining, based on the cutting edge information data and the machine operation data if the current configuration of the machine is optimized for an operation of the machine with the least a first cutting edge. In other words, with knowledge of which cutting edge that is used, it can be determined if the configuration of the machine is optimized for an operation together with the cutting edge or if the machine needs to be reconfigured with other machine settings.

According to an aspect the method further comprising the step of performing an operation of the machine with the cutting edge associated with the cutting edge information data, and the step of obtaining at least a first machine operation sensor data of a sensor configured to obtain sensor data during operation of the machine, and the step of generating a second association data indicative of the cutting edge information data and the at least first machine operation sensor data. This means for example that the cutting edge can be traced to be associated with a certain temperature of the cutting edge during processing of a piece of material dependent on how the cutting tool is inserted in the machine at a certain point of time.

According to an aspect the method further comprising the step of storing the at least first association data in a memory operatively connected to the processing circuitry and the reader device and obtaining the at least first association data from the memory by reading, by the reader device, an identification marker of a cutting edge and decoding the cutting tool identification marker to determine the cutting edge information data. This means among others that by having access to the cutting tool with a certain identification marker of a cutting edge, the reader device can be used to obtain the at least first association data from the memory in order to trace a plurality of data associated with the operation of the cutting edge dependent on how the cutting tool was inserted in the machine at a certain point of time.

According to an aspect the reader device is configured to detect and read plural identification markers of plural cutting edges of the cutting tool, when the cutting tool is inserted into the machine, and wherein the processing circuitry is further configured to cause the system to generate a request for a selection of only one identification marker of one plural cutting edge that is used in the operation of the machine. This means that a plural identification markers can be read by the reader device, and that e.g. an operator of the machine can be requested to select only one identification marker, e.g. via input of a user interface associated with the machine, to select the identification marker of one cutting edge that is used in the operation of the machine.

The disclosure further proposes a computer program product comprising a non-transitory computer readable medium, having thereon a computer program comprising program instructions, the computer program being loadable into a processing circuitry and configured to cause execution of the method, and any aspect of the method, when the computer program is run by the processing circuitry.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
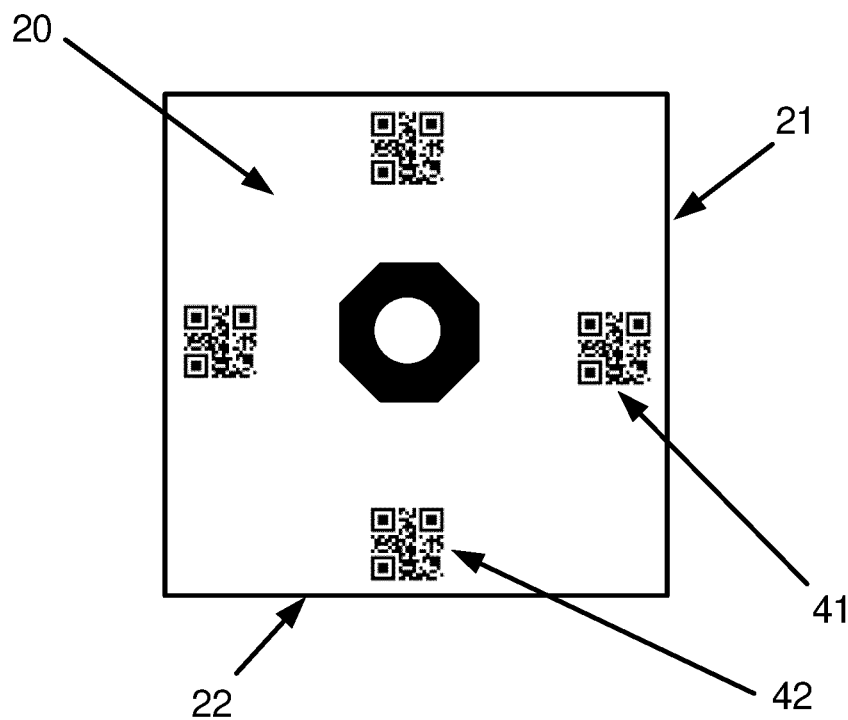
FIGS. 1a-1d illustrates different cutting tools according to some aspects of the disclosure.

Aspects of the present disclosure will be described more fully hereinafter with reference to the accompanying drawings. The method and device disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

There is a demand for an easier way to manage traceability of the cutting edges on the cutting tools. Different cutting edges can be worn differently, and a certain cutting edge may be dysfunctional on a certain cutting tool. Not knowing anything about the specific cutting edge but only the identification of the cutting tool will not help traceability of a particular cutting edge. In order to e.g. improve the use of cutting edges, there is a demand for managing traceability of each and every cutting edge, and traceability of the cutting edge when used in processing by a machine. There is also a demand for managing machine operation settings with respect to a certain cutting tool and/or a certain cutting edge of the certain cutting tool. Correct machine settings can improve the lifetime of the cutting edge and also improve the processing of the piece of material. There is also a demand for associating data such as operational data together with a specific cutting edge. Both manufacturers of cutting edges and end-customers of the cutting edges benefit from understanding operation details that are associated with each cutting edge throughout the lifetime of each cutting edge of a cutting tool. These details can e.g. help the end-customer of a cutting tool with cutting edges to e.g. manage the cutting tool and associate certain operation data with a certain cutting tool with certain cutting edges.

An object of the present disclosure is to provide a cutting tool, a system, a method and a computer program product which seek to mitigate, alleviate, or eliminate one or more of the above-identified deficiencies in the art and disadvantages singly or in any combination.

The disclosure proposes a cutting tool comprising at least a first cutting edge and at least a first identification marker arranged at the first cutting edge wherein the at least first identification marker is a machine readable code associated with a first cutting edge information data. This means that the at least a first cutting edge can be identified using the first cutting edge information data.

According to an aspect the cutting tool further comprising a second cutting edge and a second identification marker arranged at the second cutting edge wherein the second identification marker is a machine readable code associated with a second cutting edge information data. This means that the first cutting edge can be identified using the first cutting edge information data and that the second cutting edge can be identified using the second cutting edge information data.

According to an aspect the cutting tool the first identification marker is arranged on the cutting tool at a distance to the first cutting edge that is shorter than the distance from the first identification marker to the second cutting edge, and the second identification marker is arranged on the cutting tool at a distance to the second cutting edge that is shorter than the distance from the second identification marker to the first cutting edge. One advantage with this arrangement of the identification markers is hence that an operator, or a machine, can determine which cutting edge that is associated with a certain identification marker.

According to an aspect the at least first identification marker is at least any of, or a combination of at least any of, a two dimensional code; a three dimensional code, an image a Quick Response code; a High Capacity Colored Two Dimensional Code; a European Article Number code; a DataMatrix code or a MaxiCode. This means that the at least first identification marker is visually readable on the cutting tool by a machine but also visually detectable by e.g. an operator handling the cutting tool.

The disclosure proposes a cutting tool 20 comprising at least a first cutting edge 21 and at least a first identification marker 41 arranged at the first cutting edge 21. FIG. 1a-1d illustrates different cutting tools according to some aspects of the disclosure. There are different kinds of cutting tools. Examples of cutting tools are cutting inserts, milling cutters, solid end mills, turning tools, drilling tools, boaring heads, reaming tools, thread turning tools, thread milling tools, and thread tapping tools, etc.

The at least first identification marker 41 is a machine readable code associated with a first cutting edge information data 1ceID. This means that the at least a first cutting edge 21 can be identified using the first cutting edge information data 1ceID. According to an aspect the cutting edge information data is a unique identity. According to an aspect the cutting edge information data is a number and/or a combination of figures and letters. According to an aspect the cutting edge information data is a serial number. Dependent on at what point in the product lifetime the cutting tool 20 is, the cutting edge information data may comprise further information as will be discussed in more detail below.

Figure 1B:
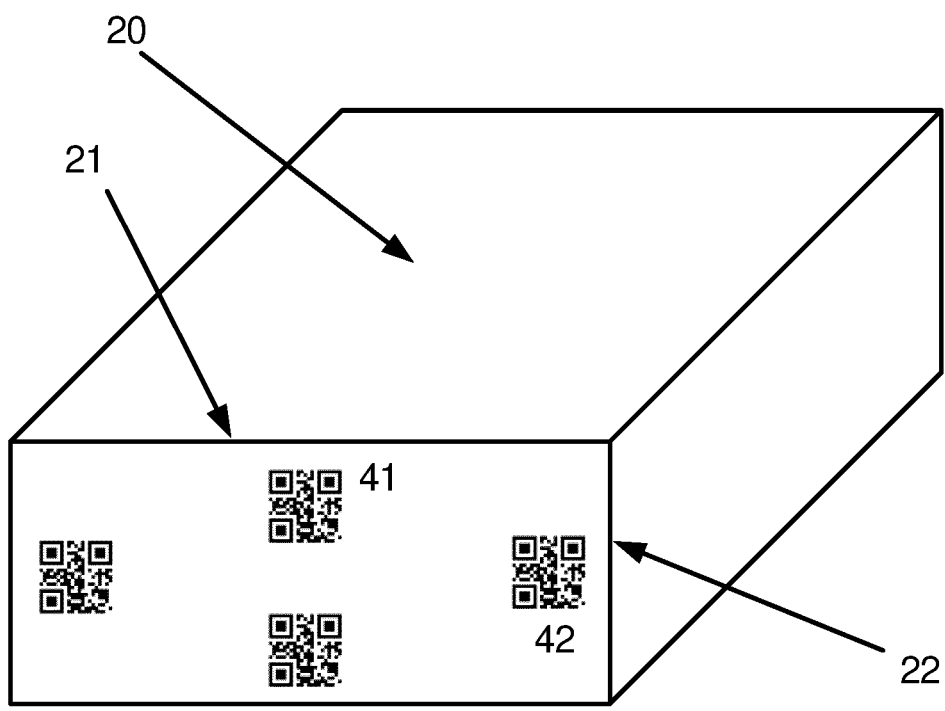
Figure 1C:
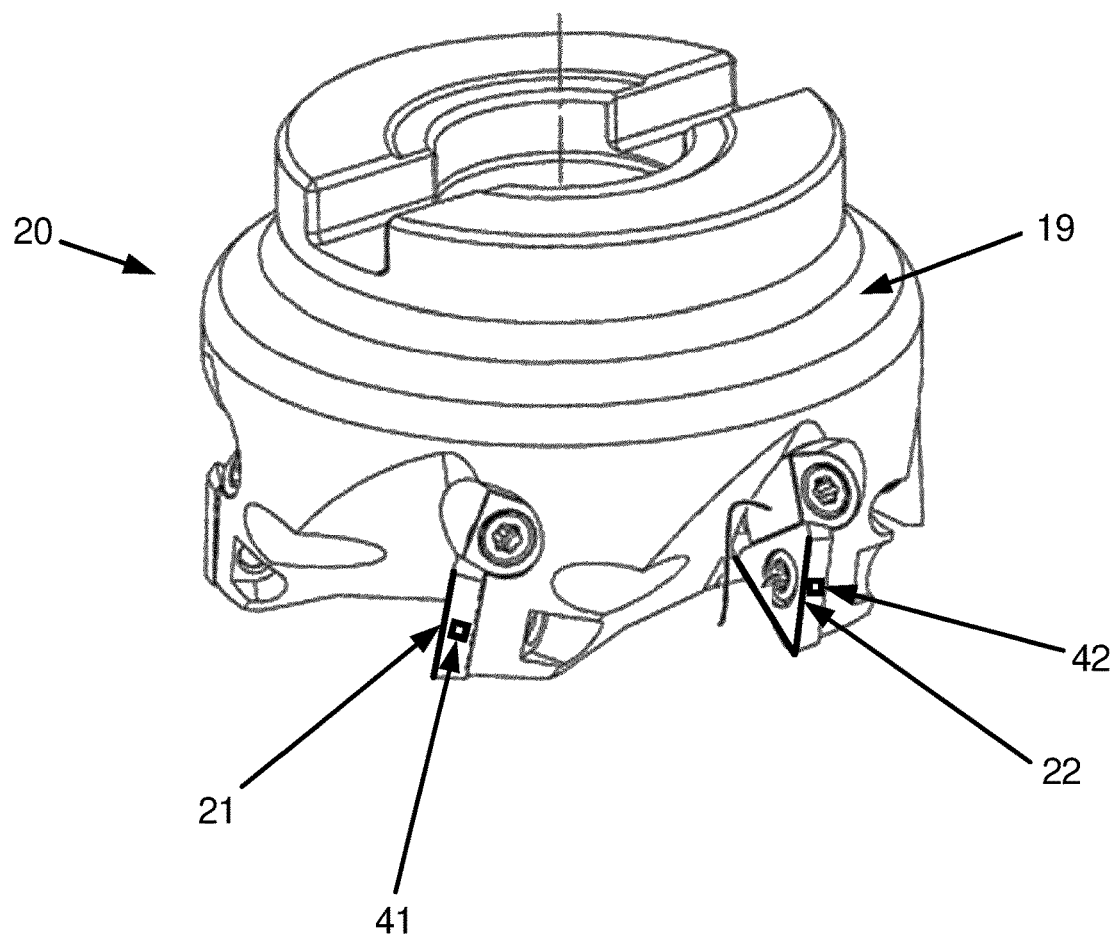
Figure 1D:
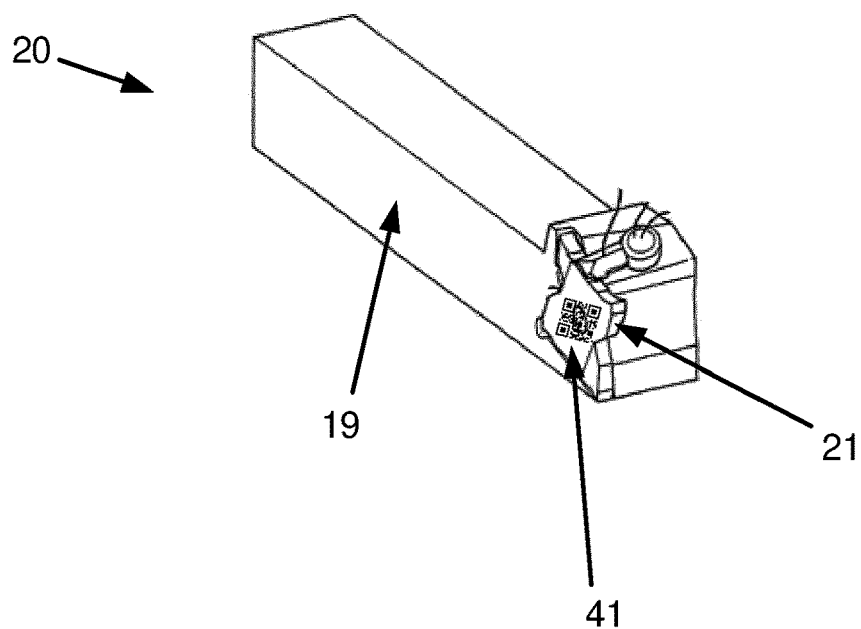

The cutting tool 20 illustrated in FIG. 1d comprising a first cutting edge 21 and a first identification marker 41 arranged at the first cutting edge 21. According to an aspect the cutting tool 20 comprising a plurality of cutting edges, as illustrated in FIGS. 1a-1c.

According to an aspect the cutting tool 20 further comprising a second cutting edge 22 and a second identification marker 42 arranged at the second cutting edge 22 wherein the second identification marker 42 is a machine readable code associated with a second cutting edge information data 2ceID. This means that the first cutting edge 21 can be identified using the first cutting edge information data 1ceID and that the second cutting edge 22 can be identified using the second cutting edge information data 2ceID. In other words the different cutting edges have different identification markers and each cutting edge can be associated with individual cutting edge information data.

According to an aspect the cutting tool 20 the first identification marker 41 is arranged on the cutting tool 20 at a distance to the first cutting edge 21 that is shorter than the distance from the first identification marker 41 to the second cutting edge 22, and the second identification marker 42 is arranged on the cutting tool 20 at a distance to the second cutting edge 22 that is shorter than the distance from the second identification marker 42 to the first cutting edge 21. This is illustrated in the FIGS. 1a-1c. One advantage with this arrangement of the identification markers is that an operator, or a machine, can determine which cutting edge that is associated with a certain identification marker. An operator can easily determine that a certain identification marker is associated with a certain cutting edge by visual inspection of the cutting tool. A machine, e.g. utilizing a camera sensor and image processing, can also determine that a certain identification marker is associated with a certain cutting edge by e.g. using object recognition to determine the distance to the cutting edge.

According to an aspect the at least first identification marker 41 is at least any of, or a combination of at least any of, a two dimensional code; a three dimensional code, an image a Quick Response code; a High Capacity Colored Two Dimensional Code; a European Article Number code; a DataMatrix code or a MaxiCode. This means that the at least first identification marker 41 is visually readable on the cutting tool 20 by a machine but also visually detectable by e.g. an operator handling the cutting tool.

According to an aspect the at least first identification marker 41 is an industry standard machine readable code. According to an aspect the at least first identification marker 41 is a company internal machine readable code. According to an aspect the at least first identification marker 41 is an open source machine readable code.

According to an aspect the at least first identification marker 41 is applied using different colours. According to an aspect the at least first identification marker 41 is etched at the cutting tool close to the cutting edge or etched on the surface of the cutting edge.

According to an aspect the association between the machine readable code and the cutting edge information data is defined by a known algorithm for the specific identification marker. According to an aspect cutting edge information data is coded, using a known algorithm for a specific identification marker, which determines the appearance of the identification marker.

The disclosure further proposes a system 100 for managing the operation of a machine 90 and tracing the use of a cutting edge 21, 22 of a cutting tool 20 used in the operation of the machine 90. FIGS. 2a-2d illustrates different systems according to some aspects of the disclosure. The machine 90 is illustrated in each of the FIGS. 2a-2d. The machine 90 is however of different size and have different properties that is not visualized in the FIGS. 2a-2d. In the FIGS. 2a-2d the machine 90 can also be seen as a part of a machine 90 in a larger size. There are different types of machines 90. According to an aspect the machine 90 is a machine configured to receive a cutting tool 20 and or a cutting tool holder 30. According to an aspect the cutting tool 20 is inserted in the cutting tool holder 30 as illustrated in the FIGS. 2a-2d. According to an aspect the cutting tool holder 30 is configured to receive the cutting tool 20 for processing of a piece of material by the machine 90. According to an aspect the machine 90 and/or the cutting tool holder 30 is configured to receive and/or hold at least any of a cutting tool, a cutting insert, a milling cutter, a solid end mill, a turning tool, a drilling tool, a boaring head, a reaming tool, a thread turning tool, a thread milling tool, and a thread tapping tool, etc.

The system 100 comprises a reader device 10a, 10b, 10c configured to detect and read at least a first identification marker 41, 42. The system 100 further comprises a processing circuitry 102a, 102b, 102c operatively connected to the reader device 10a, 10b, 10c.

According to an aspect the processing circuitry 102a, 102b, 102c and the reader device 10a, 10b, 10c are operatively connected to an electronic device 1a, 1b, 1c. According to an aspect the electronic device 1a, 1b, 1c comprises the processing circuitry 102a, 102b, 102c operatively connected to the reader device 10a, 10b, 10c.

According to an aspect the reader device 10a, 10b, 10c comprises at least one of a camera configured to obtain images. The reader device 10a, 10b, 10c may be a component integrated in the electronic device 1a, 1b, 1c or a stand-alone component. According to an aspect the electronic device 1a, 1b, 1c is configured to be connected with the reader device 10a, 10b, 10c.

According to an aspect the electronic device 1a, 1b, 1c is configured to be connected to a communication network 50.

Figure 2A:
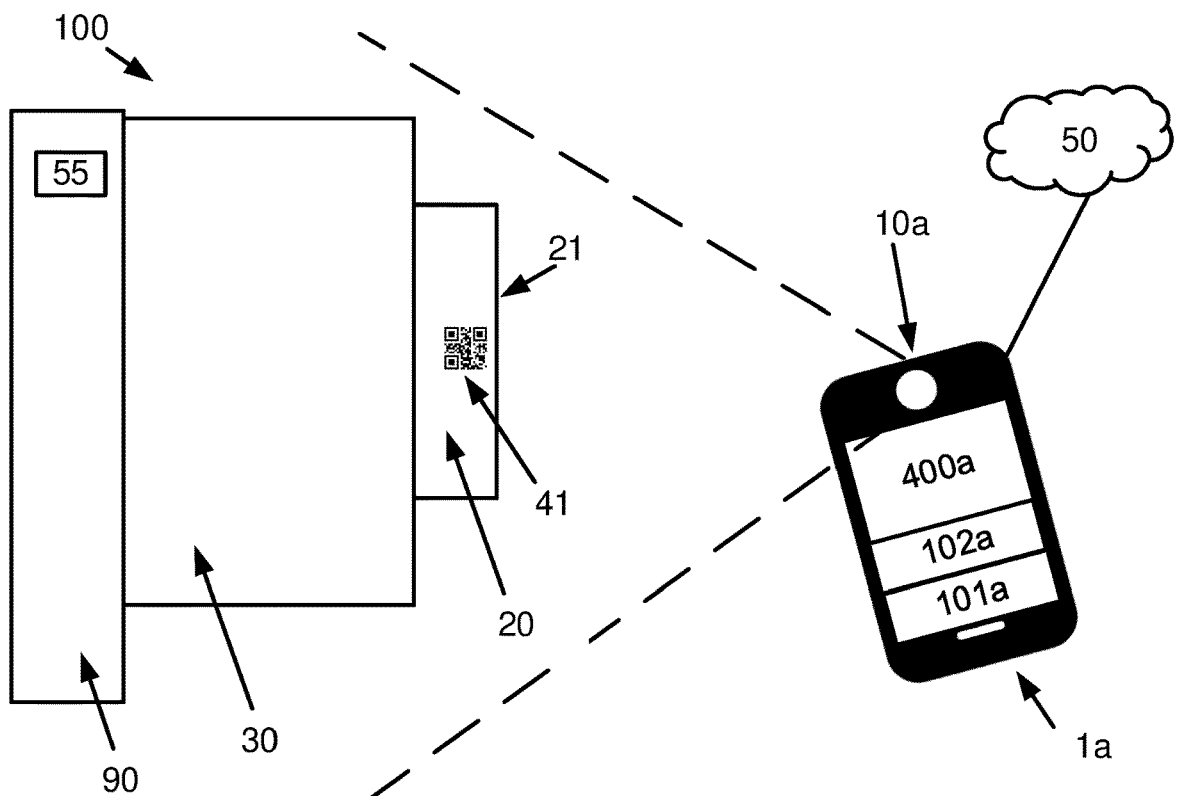
FIGS. 2a-2d illustrates different systems according to some aspects of the disclosure.
Figure 2B:
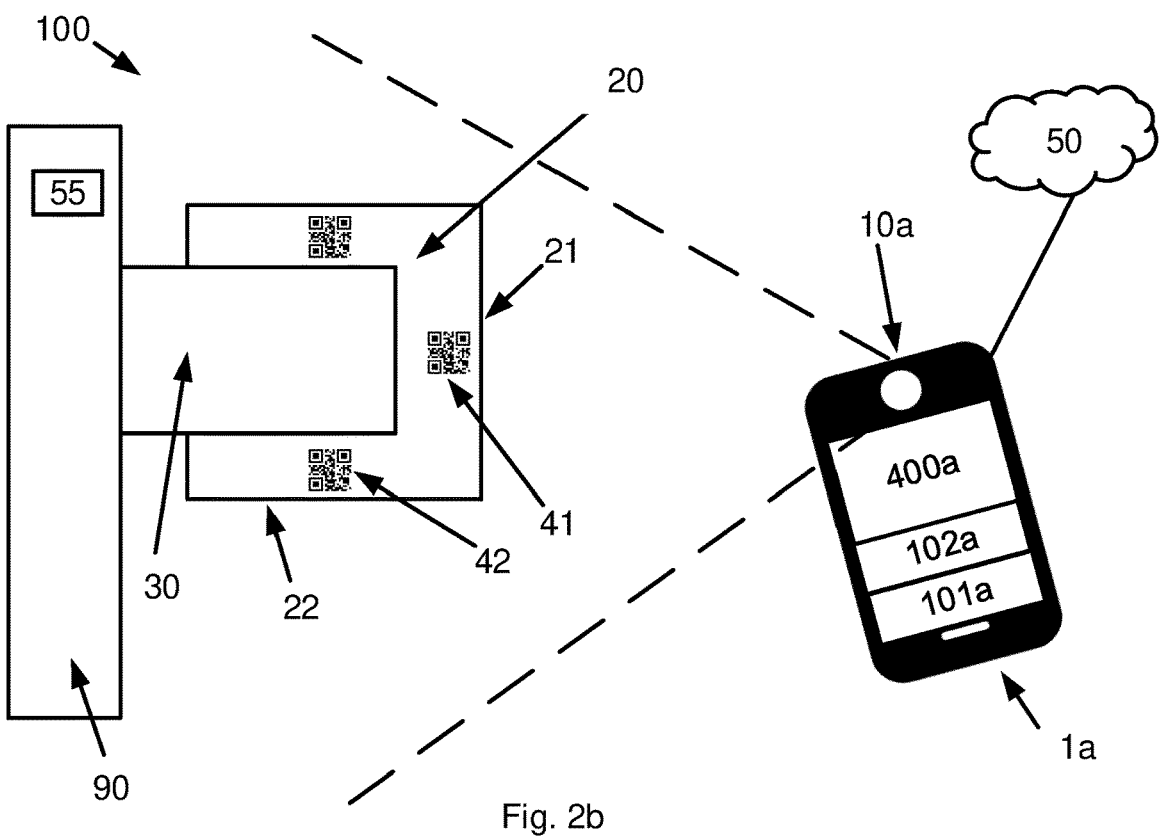

FIG. 2a and FIG. 2b illustrates an electronic device 1a in form of a smartphone, tablet, cellular phone, feature phone or any portable electronic device. In one example, as illustrated in FIG. 2a and in FIG. 2b, the reader device 10a is the camera of a smartphone.

Figure 2C:
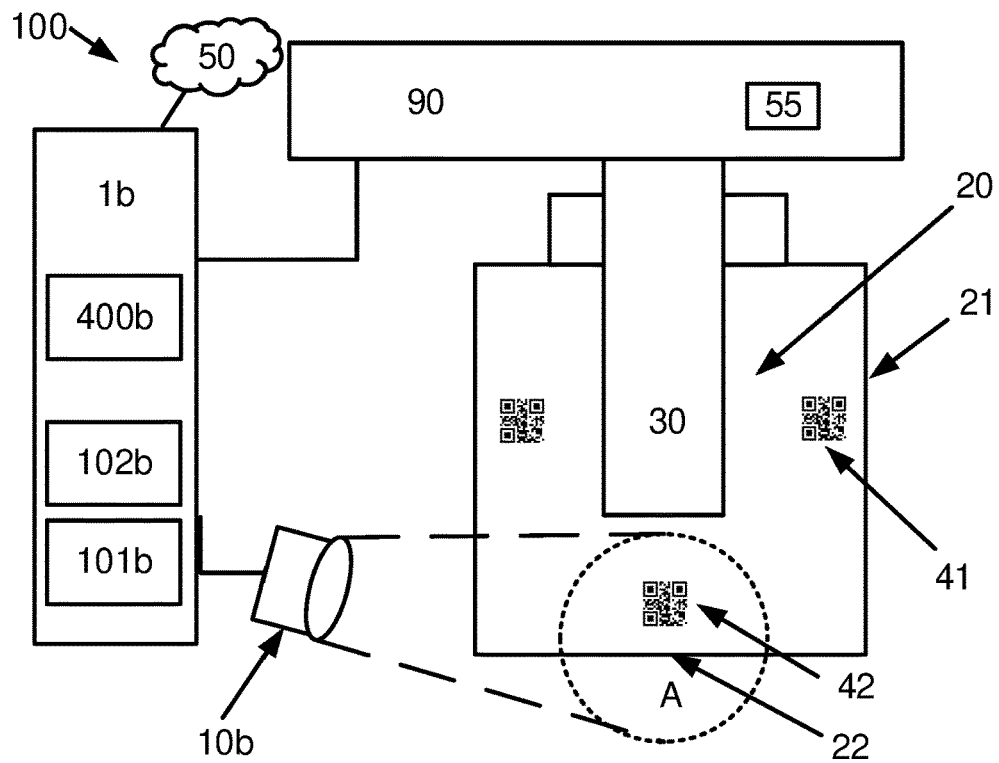
Figure 2D:
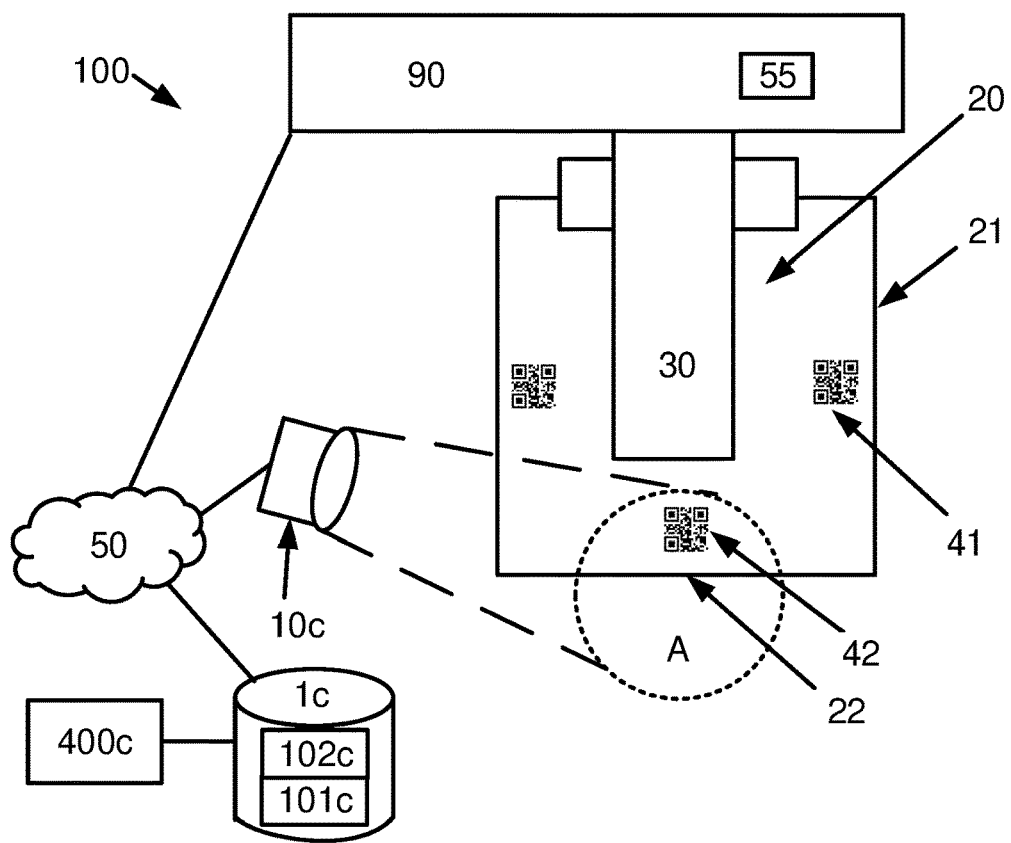
Figure 3:
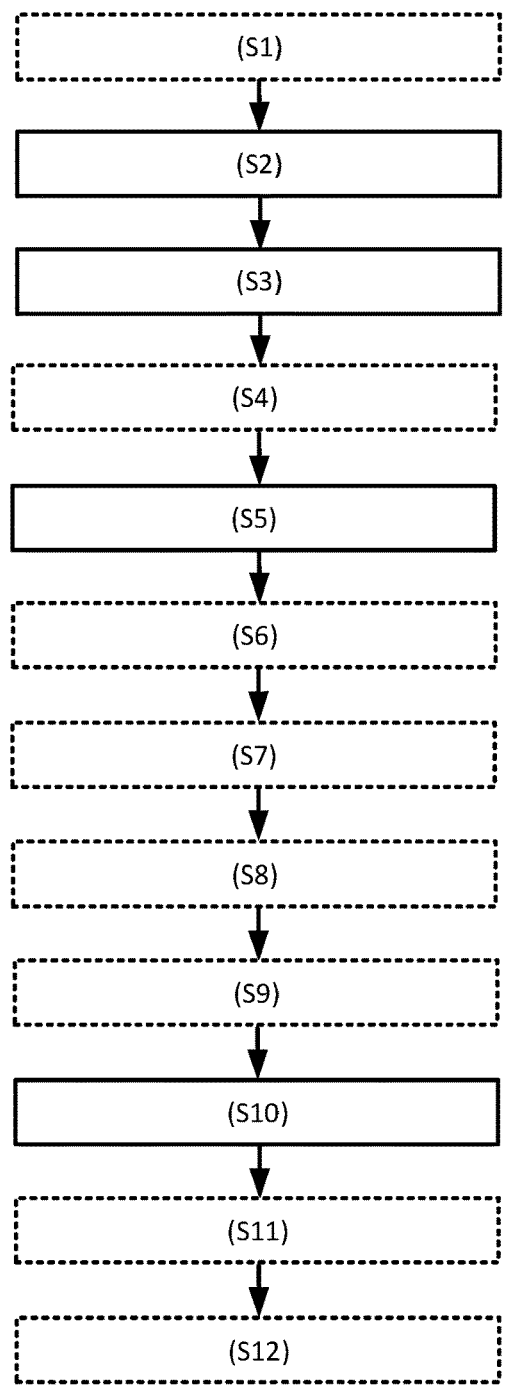
FIG. 3 illustrates a flow chart of the method steps according to some aspects of the disclosure.

In an example the electronic device 1b is a part of a machine 90 as illustrated in FIG. 2c. In an example, illustrated in FIG. 2c, the reader device 10b is a stand-alone reader device connected to the electronic device 1b and installed as a part of the machine 90. According to an aspect the electronic device is a remote server 1c connected to a reader device 10c via a communication network 50 as illustrated in FIG. 2d.

According to an aspect the electronic device 1a, 1b, 1c further comprising a memory 101a, 101b, 101c. According to an aspect one electronic device 1a, 1b, 1c is configured to be connected to another electronic device 1a, 1b, 1c via a communication network 50 as illustrated in figured 2a-2d.

In one example the communication network 50, as illustrated in FIG. 2a-2d, is a standardized wireless local area network such as a Wireless Local Area Network, WLAN, Bluetooth™, ZigBee, Ultra-Wideband, Near Field Communication, NFC, Radio Frequency Identification, RFID, or similar network. In one example the communication network 50 is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. The communication network 50 can also be a combination of both a local area network and a wide area network. The communication network 50 can also be a wired network. According to an aspect the communication network 50 is defined by common Internet Protocols.

According to an aspect the electronic device 1a, 1b, 1c is configured to be connected to a memory 101a, 101b, 101c in another the electronic device 1a, 1b, 1c via the communication network 50.

According to an aspect the processing circuitry 102a, 102b, 102c is configured to cause the electronic device 1a, 1b, 1c to detect, by the reader device 10a, 10b, 10c, an identification marker 41, 42 arranged at a cutting edge 21, 22 of the tool 20a.

The processing circuitry 102a, 102b, 102c is configured to cause the system 100 to read, by the reader device 10a, 10b, 10c, an identification marker 41, 42 of a cutting edge 21, 22 of a cutting tool 20 inserted into the machine 90. FIGS. 2a-2d illustrates a cutting tool 20 inserted into a machine 90.

When the cutting tool 20 is inserted in the machine 90 as illustrated in FIG. 2a, only one identification marker 41 is visible to be read by the reader device 10a, 10b, 10c. In this example it is determined that the cutting edge 21 associated with the indication marker 41 is the cutting edge that is currently used for processing a piece of material by the machine when the when the cutting tool 20 is inserted in the machine 90.

When the cutting tool 20 is inserted in the machine 90 as illustrated in FIG. 2b, plural identification markers 41, 42 are visible to be read by the reader device 10a, 10b, 10c. In this example it is determined that at least one of the cutting edges 21, 22 associated with the indication markers 41, 42 is currently used for processing a piece of material by the machine when the when the cutting tool 20 is inserted in the machine 90.

According to an aspect the reader device 10a, 10b, 10c is arranged to only detect and read one identification marker 41, 42 of one cutting edge 21, 22 of the cutting tool 20, when the cutting tool 20 is inserted into the machine 90. An advantage with having the reader device 10a, 10b, 10c arranged to only detect and read one identification marker 41, 42 when the cutting tool 20 is inserted into the machine 90, is that a plurality of identification markers 41, 42 can be visible but excluded from being read by the reader device 10a, 10b, 10c dependent on how the cutting tool 20 is inserted in the machine at a certain point of time.

When the cutting tool 20 is inserted in the machine 90 as illustrated in FIGS. 2c and 2d, only one identification marker 42 is possible to be read by the reader device 10a, 10b, 10c. In these examples it is determined that the cutting edge 22 associated with the indication marker 42 is the cutting edge that is currently used for processing a piece of material by the machine when the when the cutting tool 20 is inserted in the machine 90. In the example the reader device 10a, 10b, 10c is arranged to only detect and read one identification marker of one cutting edge of the cutting tool, namely the identification marker that is detectable and readable in the area illustrated as "A" in the FIGS. 2c-2d.

According to an aspect the reader device 10a, 10b, 10c is arranged to only detect and read one identification marker 41, 42 of one cutting edge 21, 22 of the cutting tool 20, when the cutting tool 20 is inserted into the machine 90 using image recognition of the cutting tool 20. According to an aspect image recognition of the cutting tool 20 is based on predetermined images of cutting tools. According to an aspect the reader device is configured to only read an identification marker 41, 42 of one cutting edge 21, 22 at a certain location of the cutting tool 20, based on image recognition of the cutting tool 20. In an example, only a predefined area of the cutting tool 20 is read by the reader device 10a, 10b, 10c based on image recognition of the cutting tool 20. According to an aspect image recognition of the cutting tool 20 is based on machine learning.

The processing circuitry 102a, 102b, 102c is further configured to cause the system 100 to decode the identification marker 41, 42 to determine a cutting edge information data 1ceID, 2ceID associated with the cutting edge 21, 22, obtain machine operation data 1mOD, 2mOD associated with the operation of the machine 90 from the machine 90 and generate a first association data 1AD indicative of the cutting edge identification data 1ceID, 2ceID and the machine operation data 1mOD, 2mOD.

According to an aspect the first association data 1AD further comprising time information data. In an example the first association data 1AD is time stamped at a first point of time and further time stamped at a second point of time. In other words a certain time or a certain time period can be associated with the first association data 1AD. According to an aspect the first association data 1AD is stored in a memory 101a, 101b, 101c.

This means for example that when a certain cutting edge 21, 22 is used for removing chips from the piece of material that is being processed by the cutting tool 20, machine operation data 1mOD, 2mOD associated with the processing is associated with the cutting edge identification data 1ceID, 2ceID. The first association data 1AD can hence be used to trace how a certain cutting edge 21, 22 has been used at a certain time or during a certain time period. In an example, the usage of a certain cutting edge 21, 22 is used for determining future use of the certain cutting edge 21, 22. In an example the first association data 1AD can be used for determining if a certain cutting edge 21, 22 has been exposed to an operation that may have caused damage to the certain cutting edge 21, 22.

According to an aspect the machine operation data 1mOD, 2mOD associated with the operation of the machine 90 is obtained via the communication network 50. According to an aspect the machine operation data 1mOD, 2mOD associated with the operation of the machine 90 is obtained via input of the machine operation data 1mOD, 2mOD via a user interface 400a, 400b, 400c, by an operator of the machine 90.

According to an aspect cutting edge information data is cutting edge identification data. An advantage with the first association data 1AD is that the use of the cutting edge 21, 22 can be traced to a certain machine operation data 1mOD, 2mOD. This means for example that the cutting edge 21, 22, can be traced to be associated with a certain operation when the cutting tool 20 is inserted in the machine at a certain point of time.

According to an aspect the processing circuitry 102a, 102b, 102c is further configured to cause the system 100 to detect, by the reader device 10a, 10b, 10c one identification marker 41, 42 arranged at the cutting edge 21, 22 used in the operation of the machine 90 when the cutting tool 20 is inserted into the machine 90. An advantage with detecting one identification marker 41, 42 arranged at the cutting edge 21, 22 is that it can be determined that a certain cutting edge 21, 22 is used when the cutting tool 20 is inserted in the machine in a certain way.

According to an aspect the processing circuitry 102a, 102b, 102c is further configured to cause the system 100 to obtain, based on the cutting edge information data 1ceID, 2ceID, a machine setting data 1mSD, 2mSD for configuring the machine 90 for an operation of the machine 90 with the cutting edge 21, 22 associated with the cutting edge information data 1ceID, 2ceID. This means that the machine 90 can be configured with machine setting data 1mSD, 2mSD that is optimizing the operation of the machine 90 together with the cutting edge 21, 22 that is used when the cutting tool 20 is inserted in the machine in a certain way.

According to an aspect the machine setting data 1mSD, 2mSD is obtained from a memory 101a, 101b, 101c and transferred to the machine 90 for automatically configuring the machine with machine setting data 1mSD, 2mSD that is optimizing the operation of the machine 90 together with the cutting edge 21, 22.

According to an aspect the machine setting data 1mSD, 2mSD is obtained from a memory 101a, 101b, 101c and presented to an operator via a user interface 400a, 400b, 400c for manually configuring the machine with machine setting data 1mSD, 2mSD that is optimizing the operation of the machine 90 together with the cutting edge 21, 22.

According to an aspect the processing circuitry 102a, 102b, 102c is further configured to cause the system 100 to determine, based on the cutting edge information data 1ceID, 2ceID and the machine operation data 1mOD, 2mOD if the current configuration of the machine 90 is optimized for an operation of the machine 90 with the cutting edge 21, 22 associated with the cutting edge information data 1ceID, 2ceID. In other words, with knowledge of which cutting edge 21, 22 that is used, it can be determined if the configuration of the machine 90 is optimized for an operation together with the cutting edge 21, 22 or if the machine 90 needs to be reconfigured with other machine settings. In an example an operator of the machine is prompted via a user interface 400a, 400b, 400c if it is determined that the machine 90 is not optimized for an operation together with the cutting edge 21, 22. In an example, an operator of a machine 90 is instructed to use a different cutting edge for optimizing the operation of the machine 90. In a further example, an operator is prompted that the cutting tool 20 is not inserted correct into the machine 90 or tool holder 30. In an example a certain identification marker 41, 42 should not be readable by the reader device 10a, 10b, 10c when the cutting tool 20 is inserted into the tool holder 30 or the machine 90 which in turn is an indication that the cutting tool is inserted correct into the machine 90 or tool holder 30.

In an example, the machine is not able to operate if it is determined that the machine 90 is not optimized for an operation together with the cutting edge 21, 22. According to an aspect, in a determination that the machine 90 is not optimized for an operation together with the cutting edge 21, 22, machine setting data 1mSD, 2mSD for configuring the machine 90 for an operation of the machine 90 is obtained and presented to an operator of the machine 90 via a user interface 400a, 400b, 400c.

According to an aspect the processing circuitry 102a, 102b, 102c is further configured to cause the system 100 to perform an operation of the machine 90 with the cutting edge 21, 22 associated with the cutting edge information data 1ceID, 2ceID, obtain at least a first machine operation sensor data 1mosD, 2mosD of a sensor 55 configured to obtain sensor data during operation of the machine 90 and generate a second association data 2AD indicative of the cutting edge information data 1ceID, 2ceID and the at least first machine operation sensor data 1mosD, 2mosD. According to an aspect the sensor 55 is any of a stand-alone sensor, or a sensor integrated in the machine, configured to obtain machine operation sensor data 1mosD, 2mosD during operation of the machine. According to an aspect the machine operation sensor data 1mosD, 2mosD is based on measurement of the environment of the cutting edge 21, 22. In an example the machine operation sensor data 1mosD, 2mosD is any of a temperature measurement data, air pressure measurement data, particle measurement data, an image sensor data. In an example the machine operation sensor data 1mosD, 2mosD is any of actual torque measurement data, actual rounds per minute data, actual force measurement data that is used for confirming and/or validating the machine operation data 1mOD, 2mOD of the machine 90.

According to an aspect the second association data 2AD further comprising time information data. In an example the second association data 2AD is time stamped at a first point of time and further time stamped at a second point of time. In other words a certain time or a certain time period can be associated with the second association data 2AD. According to an aspect the second association data 2AD is stored in a memory 101a, 101b, 101c.

An advantage with the second association data 2AD is that the use of the cutting edge 21, 22 can be traced to a certain machine operation sensor data 1mosD, 2mosD. This means for example that the cutting edge 21, 22, can be traced to be associated with a certain temperature of the cutting edge 21, 22 during processing of a piece of material dependent on how the cutting tool 20 is inserted in the machine at a certain point of time.

According to an aspect the reader device 10a, 10b, 10c is configured to detect and read plural identification markers 41, 42 of plural cutting edges 21,22 of the cutting tool 20, when the cutting tool 20 is inserted into the machine 90, and wherein the processing circuitry 102a, 102b, 102c is further configured to cause the system 100 to generate a request for a selection of only one identification marker 41, 42 of one cutting edge 21, 22 that is used in the operation of the machine 90. This means that a plural identification markers 41, 42 can be read by the reader device 10a, 10b, 10c, and that e.g. an operator of the machine 90 can be requested to select only one identification marker 41, 42, e.g. via input of a user interface 400a, 400b, 400c associated with the machine 90, to select the identification marker 41, 42 of one cutting edge 21, 22 that is used in the operation of the machine 90.

In the examples illustrated in FIGS. 2a-b the camera of a smartphone the is used as the reader device 10a. In the example illustrated in FIG. 2b, the reader device 10a detects and reads plural identification markers 41, 42 of plural cutting edges 21, 22 of the cutting tool 20, when the cutting tool 20 is inserted into the machine 90. In order to generate correct usage data the cutting edge 21 that is used needs to be selected as the cutting edge that is used. In an example an operator of a machine is prompted via a user interface 400a of the smartphone to indicate which cutting edge that used in the operation of the machine 90.

The disclosure further proposes a method for managing the operation of a machine 90 and tracing the use of a cutting edge 21, 22 of a cutting tool 20 used in the operation of the machine 90. The method comprising the step of S2 reading, by the reader device 10a, 10b, 10c, an identification marker 41, 42 of a cutting edge 21, 22 of a cutting tool 20 inserted into the machine 90 and the step of S3 decoding the identification marker 41, 42 to determine a cutting edge information data 1ceID, 2ceID associated with the cutting edge 21, 22. The method further comprising the step of S5 obtaining machine operation data 1mOD, 2mOD associated with the operation of the machine 90 from the machine 90 and S10 generating a first association data 1AD indicative of the cutting edge information data 1ceID, 2ceID and the machine operation data 1mOD, 2mOD. An advantage with the first association data 1AD is that the use of the cutting edge 21, 22 can be traced to a certain machine operation data 1mOD, 2mOD. This means for example that the cutting edge 21, 22, can be traced to be associated with a certain operation when the cutting tool 20 is inserted in the machine at a certain point of time.

According to an aspect the method further comprising the step of S1 detecting, by the reader device 10a, 10b, 10c one identification marker 41, 42 arranged at the cutting edge 21, 22 used in the operation of the machine 90 when the cutting tool 20 is inserted into the machine 90. An advantage with detecting one identification marker 41, 42 arranged at the cutting edge 21, 22 is that it can be determined that a certain cutting edge 21, 22 is used when the cutting tool 20 is inserted in the machine in a certain way.

According to an aspect the method further comprising the step of S4 obtaining, based on the cutting edge information data 1ceID, 2ceID, a machine setting data 1mSD, 2mSD for configuring the machine 90 for an operation with the cutting edge 21, 22 associated with the cutting edge information data 1ceID, 2ceID. This means that the machine 90 can be configured with machine setting data 1mSD, 2mSD that is optimizing the operation of the machine 90 together with the cutting edge 21, 22 that is used when the cutting tool 20 is inserted in the machine in a certain way.

According to an aspect the method further comprising the step of S6 determining, based on the cutting edge information data 1ceID, 2ceID and the machine operation data 1mOD, 2mOD if the current configuration of the machine 90 is optimized for an operation of the machine 90 with the least a first cutting edge 21, 22. In other words, with knowledge of which cutting edge 21, 22 that is used, it can be determined if the configuration of the machine 90 is optimized for an operation together with the cutting edge 21, 22 or if the machine 90 needs to be reconfigured with other machine settings.

According to an aspect the method further comprising the step of S7 performing an operation of the machine 90 with the cutting edge 21, 22 associated with the cutting edge information data 1ceID, 2ceID, and the step of S8 obtaining at least a first machine operation sensor data 1mosD, 2mosD of a sensor configured to obtain sensor data during operation of the machine 90, and the step of S9 generating a second association data 2AD indicative of the cutting edge information data 1ceID, 2ceID and the at least first machine operation sensor data 1mosD, 2mosD. This means for example that the cutting edge 21, 22, can be traced to be associated with a certain temperature of the cutting edge 21, 22 during processing of a piece of material dependent on how the cutting tool 20 is inserted in the machine at a certain point of time.

According to an aspect the method further comprising the step of S11 storing the at least first association data 1AD, 2AD in a memory 101a, 101b, 101c operatively connected to the processing circuitry 102a, 102b, 102c and the reader device 10a, 10b, 10c and S12 obtaining the at least first association data 1AD, 2AD from the memory 101a, 101b, 101c by reading, by the reader device 10a, 10b, 10c, an identification marker 41, 42 of a cutting edge 21, 22 and decoding the cutting tool identification marker 41, 42 to determine the cutting edge information data 1ceID, 2ceID. This means among others that by having access to the cutting tool 20 with a certain identification marker 41, 42 of a cutting edge 21, 22, the reader device 10a, 10b, 10c can be used to obtain the at least first association data 1AD, 2AD from the memory 101a, 101b, 101c in order to trace a plurality of data associated with the operation of the cutting edge 21, 22 dependent on how the cutting tool 20 was inserted in the machine at a certain point of time. In an example, the at least first association data 1AD, 2AD is obtained from the memory 101a, 101b, 101c and presented to an operator via a user interface 400a, 400b, 400c. In an example, the at least first association data 1AD, 2AD is obtained from the memory 101a, 101b, 101c by a request based on cutting edge information data 1ceID, 2ceID inputted by an operator via a user interface 400a, 400b, 400c.

According to an aspect the reader device 10a, 10b, 10c is configured to detect and read plural identification markers 41, 42 of plural cutting edges 21, 22 of the cutting tool 20, when the cutting tool 20 is inserted into the machine 90, and wherein the processing circuitry 102a, 102b, 102c is further configured to cause the system 100 to generate a request for a selection of only one identification marker 41, 42 of one plural cutting edge 21, 22 that is used in the operation of the machine 90. This means that a plural identification markers 41, 42 can be read by the reader device 10a, 10b, 10c, and that e.g. an operator of the machine 90 can be requested to select only one identification marker 41, 42, e.g. via input of a user interface 400a, 400b, 400c associated with the machine 90, to select the identification marker 41, 42 of one cutting edge 21, 22 that is used in the operation of the machine 90.

Figure 4:
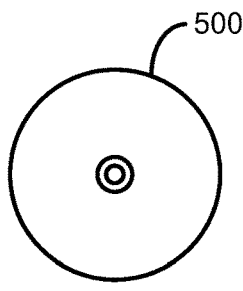
FIG. 4 illustrates a computer program product according to some aspects of the disclosure.

The disclosure further proposes, as illustrated in FIG. 4, a computer program product 500 comprising a non-transitory computer readable medium, having thereon a computer program comprising program instructions, the computer program being loadable into a processing circuitry 102a, 102b, 102c and configured to cause execution of the method, and any aspect of the method, when the computer program is run by the processing circuitry 102a, 102b, 102c.

According to an aspect processing circuitry 102a, 102b, 102c is further configured to cause the system 100 to carry out any or more of the aspects of the described method. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A system for managing the operation of a machine and tracing the use of a cutting edge of a cutting tool used in the operation of the machine, the system comprising:
    a reader device configured to detect and read plural identification markers;
    a user interface associated with the machine;
    a processing circuitry operatively connected to the reader device; and
    a computer program product including a non-transitory computer readable medium having thereon a computer program including program instructions, the computer program being loadable into the processing circuitry and configured, when run by the processing circuitry, to cause the system to:
        read, by the reader device, the plural identification markers of the cutting edges of the cutting tool when the cutting tool is inserted into the machine;
        decode the identification markers to determine cutting edge information data associated with the cutting edges;
        generate a request for a selection of only one identification marker of one cutting edge that is used in the operation of the machine;
        present the request for a selection of only one identification marker via the user interface;
        obtain machine operation data associated with the operation of the machine from the machine; and
        generate a first association data indicative of cutting edge identification data and the machine operation data.

2. The system according to claim 1, wherein the processing circuitry is further configured to cause the system to obtain, based on the cutting edge information data, machine setting data for configuring the machine for an operation of the machine with the cutting edge associated with the cutting edge information data.

3. The system according to claim 1, wherein the processing circuitry is further configured to cause the system to determine, based on the cutting edge information data and the machine operation data, if the current configuration of the machine is optimized for an operation of the machine with the cutting edge associated with the cutting edge information data.

4. The system according to claim 1, wherein the processing circuitry is further configured to cause the system to perform an operation of the machine with the cutting edge associated with the cutting edge information data, obtain at least a first machine operation sensor data of a sensor configured to obtain sensor data during operation of the machine, and generate a second association data indicative of the cutting edge information data and the at least first machine operation sensor data.

5. A method for managing the operation of a machine and tracing the use of a cutting edge of a cutting tool used in the operation of the machine, the method comprising:
    reading, by a reader device, a plural identification markers of plural cutting edges of the cutting tool when the cutting tool is inserted into the machine;
    decoding the identification markers to determine a cutting edge information data associated with the cutting edges;
    generating a request for a selection of only one identification marker of one cutting edge that is used in the operation of the machine;
    presenting the request for a selection of only one identification marker via a user interface associated with the machine;
    obtaining machine operation data associated with the operation of the machine from the machine; and
    generating a first association data indicative of the cutting edge information data and the machine operation data.

6. The method according to claim 5, further comprising obtaining, based on the cutting edge information data, machine setting data for configuring the machine for an operation with the cutting edge associated with the cutting edge information data.

7. The method according to claim 5, further comprising determining, based on the cutting edge information data and the machine operation data, if the current configuration of the machine is optimized for an operation of the machine with the cutting edge.

8. The method according to claim 5, further comprising performing an operation of the machine with the cutting edge associated with the cutting edge information data, obtaining at least first machine operation sensor data of a sensor configured to obtain sensor data during operation of the machine, and generating second association data indicative of the cutting edge information data and the at least first machine operation sensor data.

9. The method according to claim 5, further comprising storing the at least first association data in a memory operatively connected to the processing circuitry and the reader device, and obtaining the at least first association data from the memory by reading, by the reader device, an identification marker of a cutting edge and decoding the cutting tool identification marker to determine the cutting edge information data.

10. A computer program product comprising a non-transitory computer readable medium, having thereon a computer program comprising program instructions, the computer program being loadable into a processing circuitry and configured to cause execution of the method according to claim 5 when the computer program is run by the processing circuitry.

* * * * *